United States Patent
Wang et al.

(10) Patent No.: US 7,467,684 B2
(45) Date of Patent: Dec. 23, 2008

(54) ANTI-ROLL THRUST SYSTEM FOR HYDROGEN POWERED VEHICLES

(75) Inventors: Jenne-Tai Wang, Troy, MI (US); Robert A. Lutz, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 323 days.

(21) Appl. No.: 11/049,448

(22) Filed: Feb. 2, 2005

(65) Prior Publication Data

US 2005/0242557 A1    Nov. 3, 2005

Related U.S. Application Data

(60) Provisional application No. 60/562,143, filed on Apr. 14, 2004.

(51) Int. Cl.
*B60K 28/014* (2006.01)
(52) U.S. Cl. ............... 180/282; 280/5.506; 280/755
(58) Field of Classification Search ........... 180/271, 180/282; 280/5.506, 755
See application file for complete search history.

(56) References Cited

U.S. PATENT DOCUMENTS

| | | | |
|---|---|---|---|
| 3,580,354 A * | 5/1971 | Hewitt | 180/282 |
| 3,995,656 A * | 12/1976 | Mills, Jr. | 137/497 |
| 5,282,357 A * | 2/1994 | Sackheim | 60/204 |
| 5,401,055 A | 3/1995 | Pham | |
| 5,765,783 A | 6/1998 | Albion | |
| 5,931,499 A | 8/1999 | Sutherland | |
| 6,065,558 A | 5/2000 | Wielenga | |
| 6,095,459 A * | 8/2000 | Codina | 244/213 |
| 6,170,847 B1 * | 1/2001 | Pham | 280/298 |
| 6,394,738 B1 | 5/2002 | Springer | |
| 6,556,908 B1 | 4/2003 | Lu et al. | |
| 6,588,799 B1 | 7/2003 | Sanchez | |
| 6,892,525 B2 * | 5/2005 | Guiheen et al. | 60/200.1 |
| 6,938,924 B2 * | 9/2005 | Feldman et al. | 280/755 |
| 2005/0230176 A1 * | 10/2005 | Wang | 180/282 |

OTHER PUBLICATIONS

SAE 950306, "Analysis of Simple Rollover Metrics," Lund and Bernard (p. 23-40).
Special Report 265, The National Highway Traffic Safety Administration's "Rating System for Rollover Resistance—An Assessment," (p. iv-135).
Office Action dated Oct. 4, 2007 from U.S. Appl. No. 11/049,555.

* cited by examiner

*Primary Examiner*—Paul N. Dickson
*Assistant Examiner*—Timothy Wilhelm

(57) ABSTRACT

A thruster system is provided for a vehicle that can be used to reduce the roll propensity of a motor vehicle. The system utilizes a control system and multiple sets of thrusters which are strategically placed upon the vehicle. The control system is provided for detecting a potential roll condition and activates selected ones of the thrusters to produce a necessary thrust force for counteracting roll forces. The thrusters are connected to an on-board pressurized gas source that generates the anti-roll thrust force.

15 Claims, 10 Drawing Sheets

FIG 3
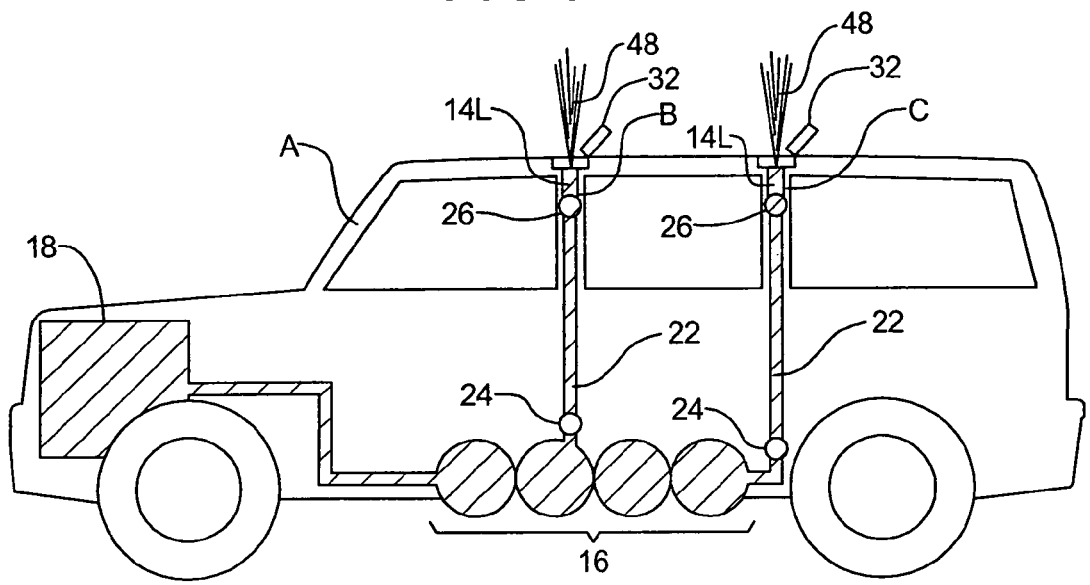
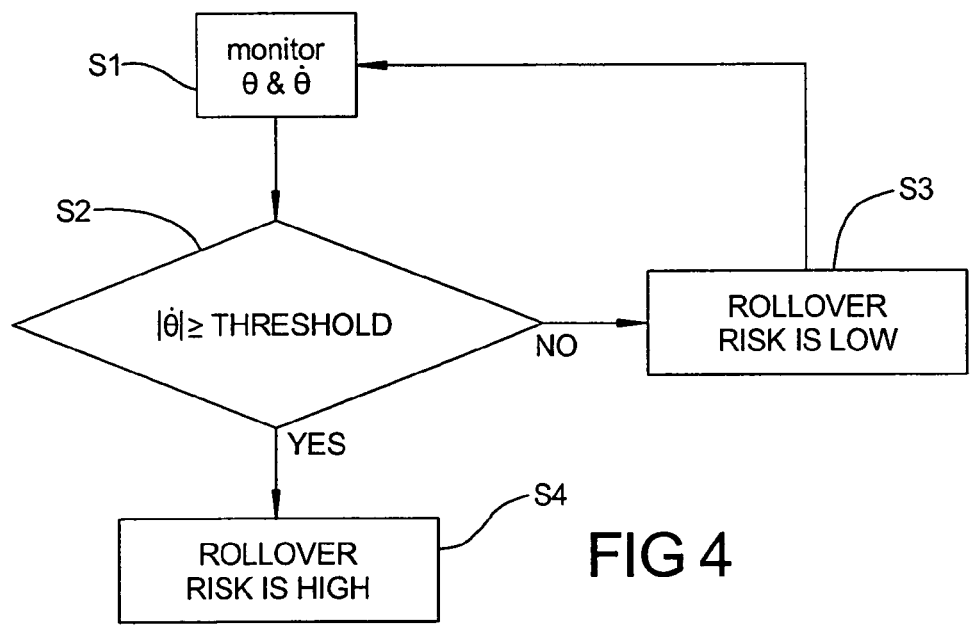
FIG 4

(a) $\theta = \theta_0$ (b) $\theta = \frac{\pi}{2}$

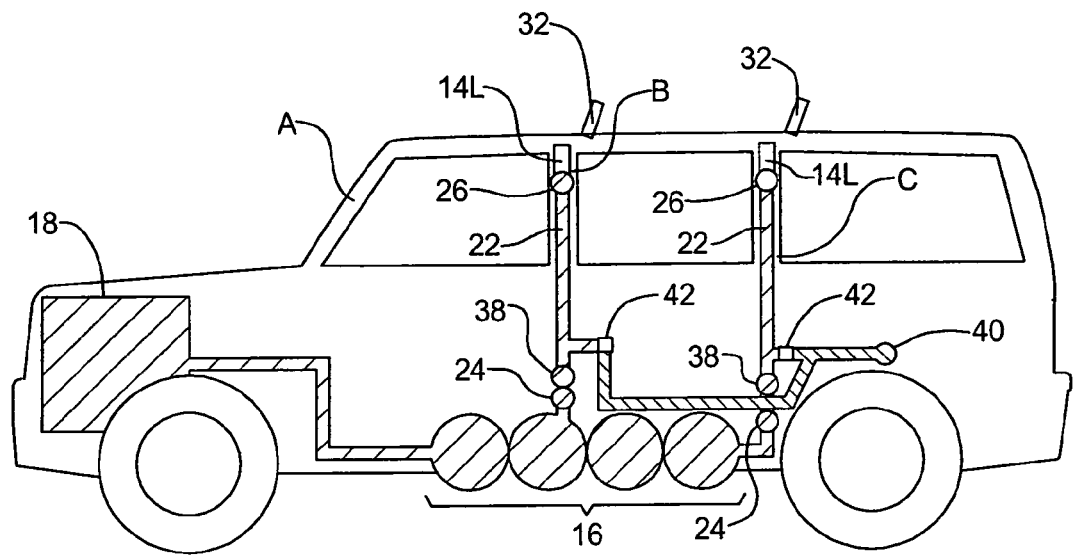
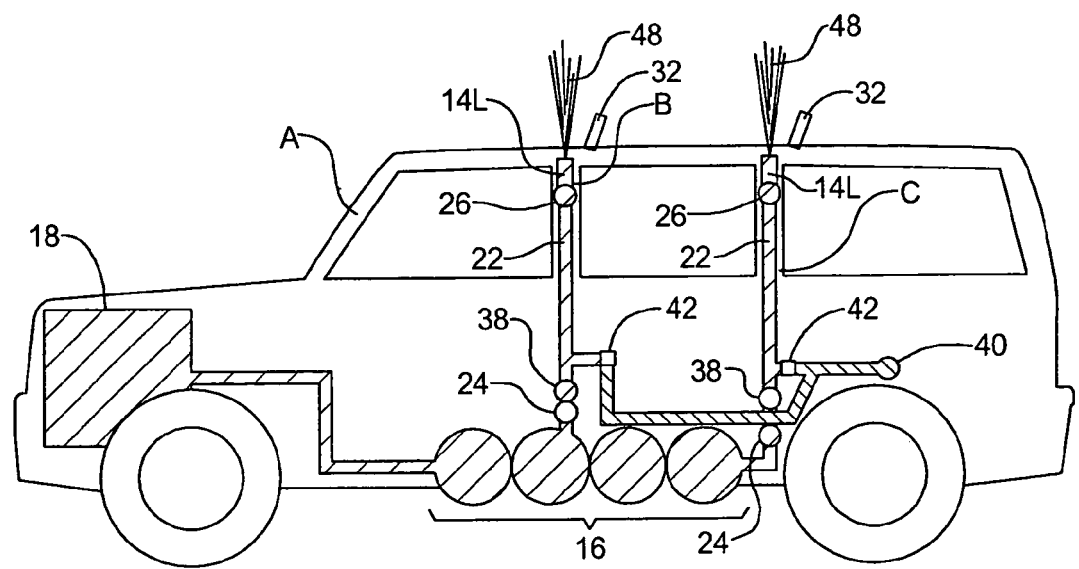

FIG 11
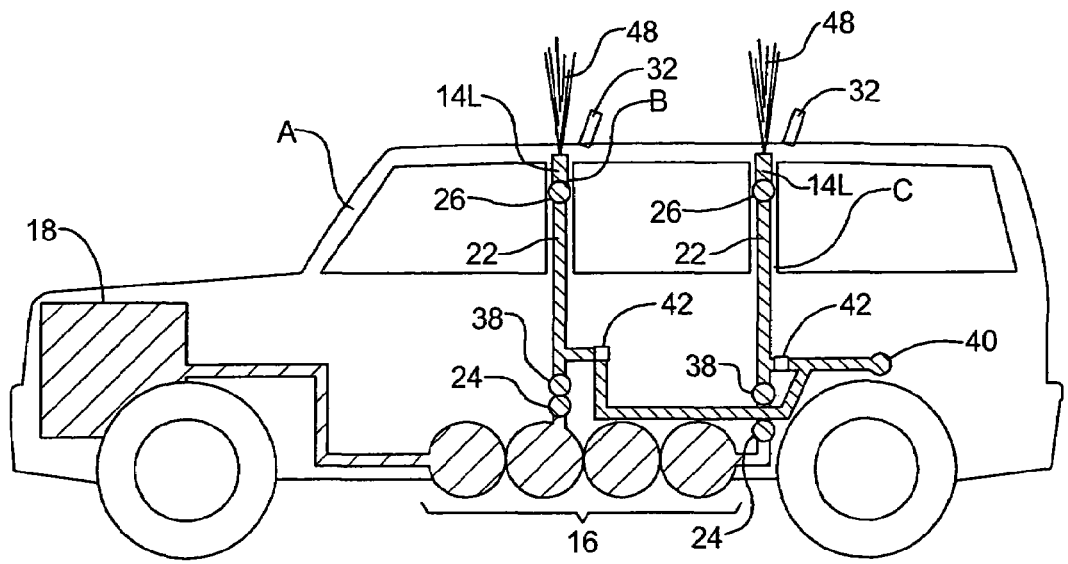
FIG 12    θ̄ (VEHICLE ROLL ANGLE) DEGREE
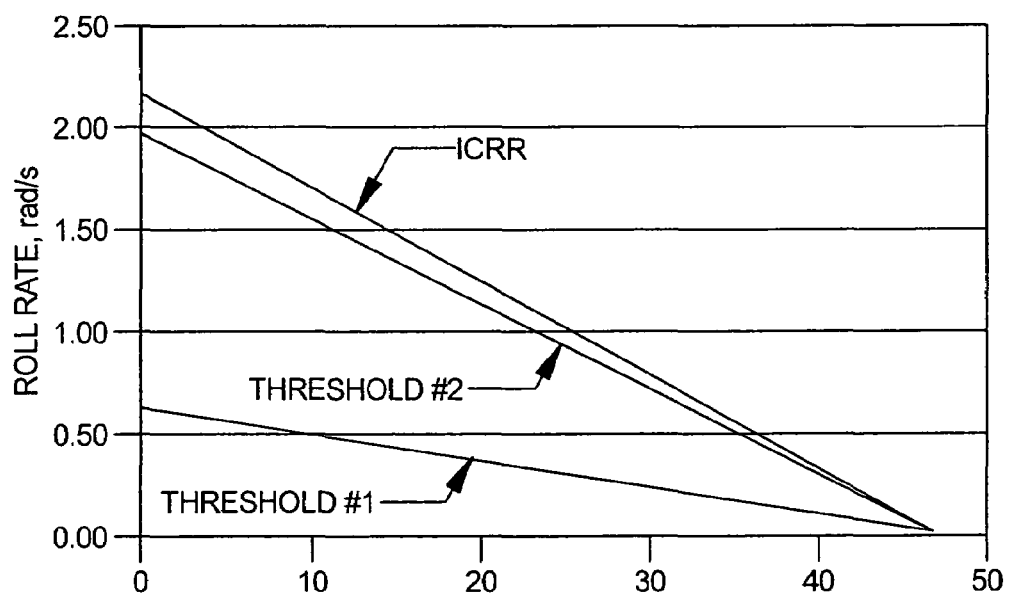

ANTI-ROLL THRUST SYSTEM FOR HYDROGEN POWERED VEHICLES

CROSS-REFERENCE TO RELATED APPLICATIONS

This application claims the benefit of U.S. Provisional Application No. 60/562,143, filed on Apr. 14, 2004, the disclosure of which is incorporated herein by reference.

FIELD OF THE INVENTION

The present invention relates to an anti-roll system for a vehicle, and more particularly, to an anti-roll system which employs thrusters supplied with on-board pressurized hydrogen or other gas for producing a thrust force for resisting roll forces acting on a vehicle.

BACKGROUND OF THE INVENTION

Auto manufacturers have developed systems to aid in vehicle stability, such as variable ride height suspension systems, anti-lock braking systems and electronic stability control systems.

Auto manufacturers are further developing automobiles having alternative power sources to internal combustion engines. Electrical vehicles having rechargeable batteries and hybrid vehicles using both internal combustion engines and electric motors for driving the vehicle are becoming available. Electrochemical fuel cells are also being developed to serve as an alternate source of electricity for powering electric drive motors of an automobile. An electrochemical fuel cell contains a membrane sandwiched between electrodes. One preferred fuel cell is known as a proton exchange membrane (PEM) fuel cell, in which hydrogen ($H_2$) is used as a fuel source or reducing agent at an anode electrode and oxygen ($O_2$) is provided as the oxidizing agent at a cathode electrode. During operation of the fuel cell, electricity is garnered by electrically conductive elements proximate to the electrodes via the electrical potential generated during the reduction-oxidation reaction occurring within the fuel cell. For on-board vehicle fuel cell systems, the hydrogen can be stored in a pressurized tank that is typically between full fuel (for example, 10,000 p.s.i.) and low fuel (for example, 500 p.s.i.), depending upon the amount the tank is filled and the fuel is consumed.

SUMMARY OF THE INVENTION

The present invention is directed to an anti-roll system that is designed to reduce the roll propensity of a motor vehicle. The system includes a first thruster mounted on a first side of the motor vehicle and a second thruster mounted on a second side of the motor vehicle. Each of the first and second thrusters is provided in selective communication with a source of pressurized gas. The source of pressurized gas can be either pressurized hydrogen which is also utilized in combination with an on-board fuel cell, or a separate pressurized gas source. A controller system is provided for detecting a potential roll condition of the vehicle and releasing pressurized gas from the pressurized gas source to one of the thrusters for generating a counteracting force for resisting the detected potential roll condition.

According to one aspect of the present invention, the first and second thrusters are each mounted in a side pillar of the motor vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a side view of the vehicle illustrated in FIG. 2 with the anti-roll thrusters illustrated in an activated state;

FIG. 4 is a-flow diagram of a roll-over risk estimation algorithm according to the principles of the present invention;

FIG. 9 is a side schematic view of a vehicle shown in FIG. 8 illustrating the system when the roll-over risk is high;

FIG. 10 is a side schematic view of the system shown in FIG. 8 with the thrusters being activated to apply a resistance force for resisting vehicle roll over according to the principles of the present invention;

FIG. 11 is a side schematic view of the system shown in FIG. 8, with a nitrogen purging system activated after the roll-over risk has subsided;

FIG. 12 is a graphical illustration of the first and second activation thresholds according to the principles of the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
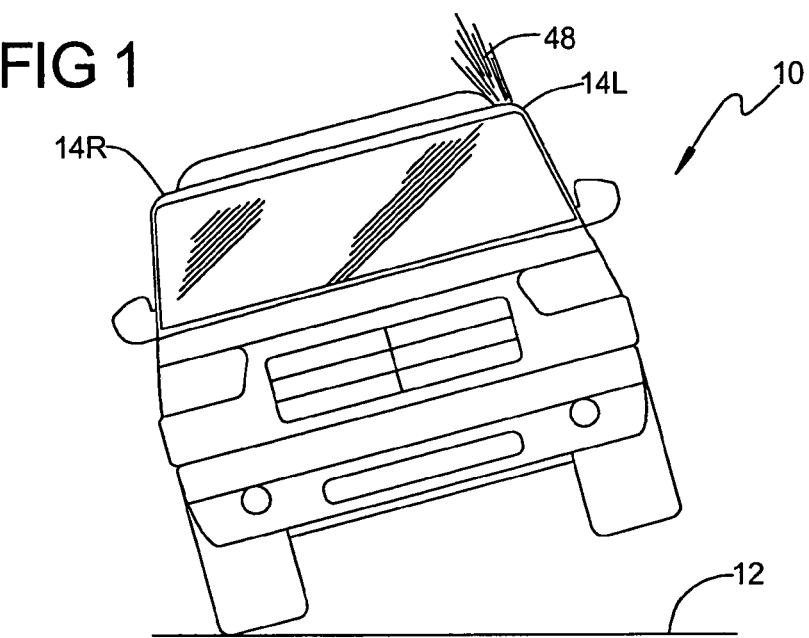
FIG. 1 is a front view of a vehicle having a thruster located in the pillars of the vehicle for applying a roll resisting force to the vehicle according to the principles of the present invention.
Figure 2:
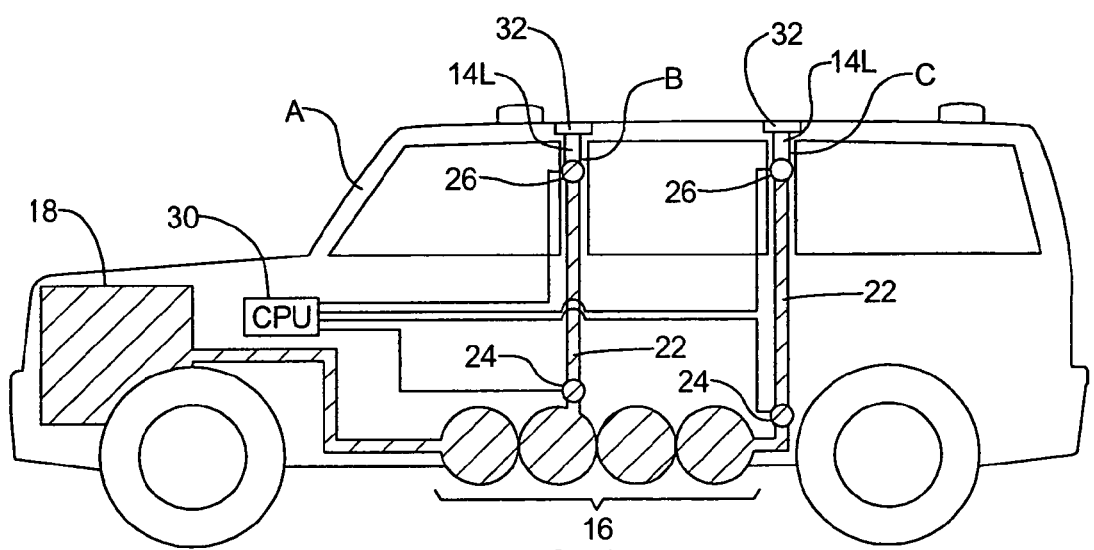
FIG. 2 is a side view schematically illustrating the potential mounting locations of the thrusters and illustrating the pressurized gas piping system according to the principles of the present invention.

With reference to FIG. 1, a vehicle 10 is shown in a potential roll condition relative to a surface 12 with a vehicle 10 having a thruster 14 activated for applying a force ($F_T$) for resisting the roll forces acting on the vehicle 10. According to the present invention, the vehicle 10 is provided with one or more thrusters 14 provided on each side of the vehicle and mounted within one of the A pillar, B pillar, or C pillar of the vehicle. It should be understood that the thrusters can be mounted to other advantageous locations of the vehicle, including the engine compartment, trunk, door, or anywhere else where the thruster force is desired and where packaging space can be found with the thrusters. As illustrated in FIG. 2, multiple thrusters 14L can be provided on each side of the vehicle. It should be understood that although thrusters 14L are illustrated in FIG. 2 on the left hand side of the vehicle, thrusters (not shown) are mounted to the right-hand side of the vehicle in the same manner as illustrated in FIG. 2.

The thrusters 14 are connected to a source of pressurized gas such as an on-board pressurized hydrogen tank 16 which also provides hydrogen to an on-board fuel cell system 18 which is utilized for providing electricity for driving electric drive motors of the vehicle. The electric drive motors can be provided at each wheel for providing drive torque thereto as is known in the art.

A gas delivery system 20 to each thruster 14L, 14R includes a conduit 22 in the form of a pipe or tube having a pressure regulator valve 24 disposed in close proximity to the hydrogen tanks 16 and a fast action valve 26 disposed in close proximity to the thrusters 14. A controller 30 is provided for controlling the regulator and fast action valves 24, 26. The pressure regulators are used to allow a much lower gas pressure (for example, 500 p.s.i.) than the fuel tank pressure (which can approach 10 thousand p.s.i.) and the piping between the pressure regulator valve 24 and the nozzles 14. The controller 30 can regulate the pressure regulator valve such that the level of the pressure allowed through the pressure regulator valves can be adjusted based on the severity prediction of a roll event. The passenger side gas delivery system (not shown) is identical to the driver side.

A vehicle roll sensor is used by the control module 30 to monitor the instantaneous roll angle and roll rate of the vehicle. A roll risk estimation algorithm is illustrated in FIG. 4 in which at Step S1, the instantaneous roll angle $\theta$ and roll rate $\dot{\theta}$ are monitored. At Step S2, the instantaneous roll rate of the vehicle is compared with a predetermined threshold value. If the instantaneous roll rate of the vehicle is not greater than the threshold, as determined at Step S3, then the roll over risk is determined to be low, while if the instantaneous roll rate of the vehicle is greater than, or equal to, the threshold value as determined as Step S4, the roll-over risk is determined to be high.

Figure 5:
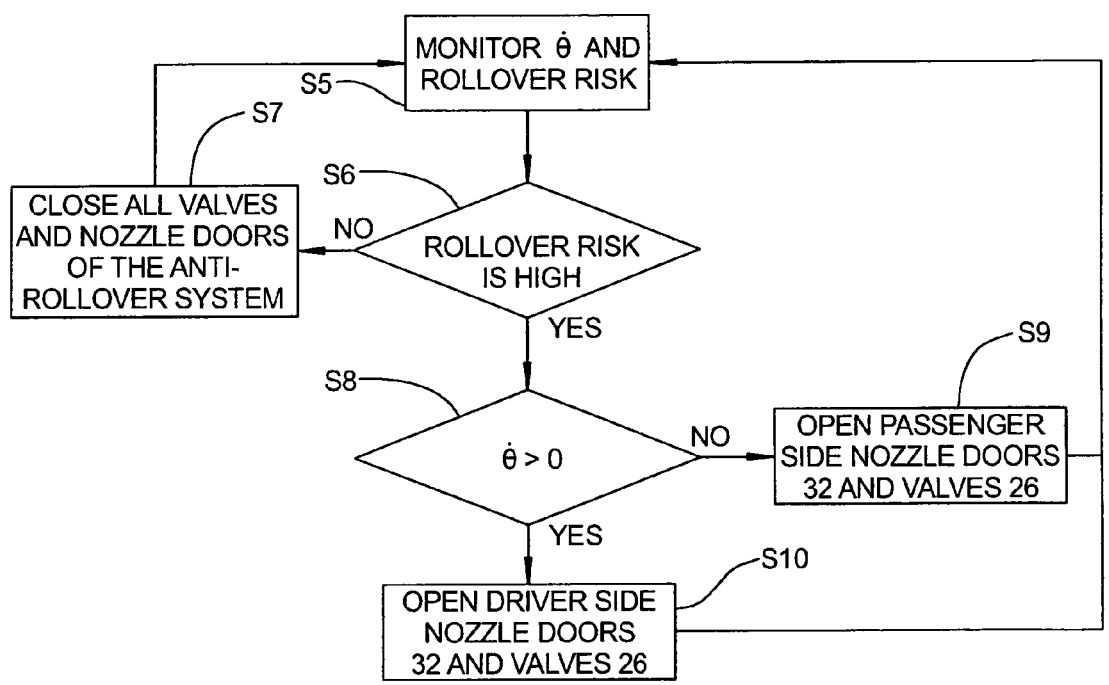
FIG. 5 is a flow diagram of a control algorithm for the anti-roll thruster system according to the principles of the present invention.

As illustrated in FIG. 5, an anti-roll thruster activation and reset algorithm is shown which is implemented in the control module 30. Upon determination that the roll risk is high, as illustrated in FIG. 4, the algorithm of FIG. 5 continues to monitor the vehicle roll rate and roll-over risk at Steps S5 and S6. If in Step S6 it is determined that the roll-over risk is no longer high, instruction is given to close all valves and nozzle doors of the anti-roll system in Step S7. If it is determined that the roll-over risk is high at Step S6, it is determined whether the roll rate of the vehicle $\dot{\theta}$ is greater than zero. If it is determined at Step S8 that the vehicle roll rate $\dot{\theta}$ is not greater than zero, the algorithm goes to Step S9 in which the passenger side nozzle doors 32 and fast-action valves 26 are opened. If, at Step S8 it is determined that the vehicle roll rate $\dot{\theta}$ is greater than zero, the algorithm proceeds to Step S10 in which the driver side nozzle doors 32 and valves 26 are opened.

Figure 7:
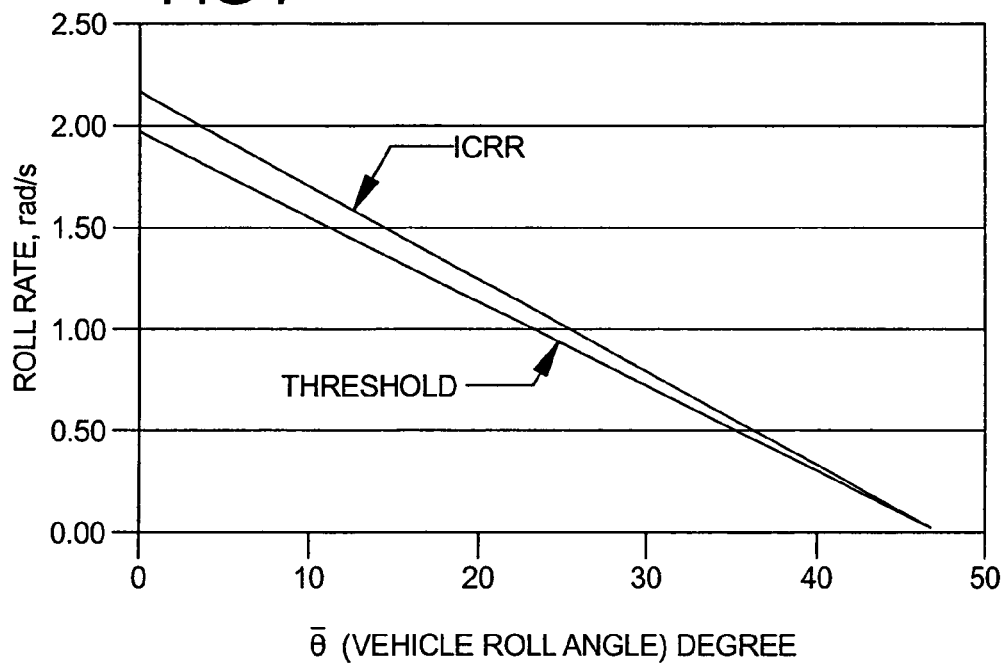
FIG. 7 is a graphical illustration of the instantaneous critical roll rate utilized for determining activation of the thrusters according to the principles of the present invention.

As illustrated in FIG. 3, the nozzle doors 32 are shown in an open position and a jet of hydrogen gas 48 is expelled from each of the thrusters 14 with the passage 22 being filled with hydrogen since the regulator valve 24 and fast action valves 26 have all been opened. Roll-over risk of the vehicle is estimated by comparing the instantaneous roll angle and roll rate of the vehicle with a predetermined threshold called the "instantaneous critical roll rate" (ICRR), which is established based on roll-over characteristics of the vehicle as determined, for example, from FIG. 7. This is determined by setting the threshold value equal to:

Threshold=$s \times (ICRR)$ where "s" is a scaling factor which is less than, or equal to, one and greater than zero. The instantaneous critical roll rate is determined from the equation:

$$ICRR = \sqrt{\frac{2mgr}{I_O}(1-\sin\bar{\theta})} \text{ where}$$

$$r = \sqrt{h_{CG}^2 + \frac{T^2}{4}}$$

$$I_O = I_{CG} + mr^2$$

$$\bar{\theta} = \theta - \theta_0 \text{ and}$$

$$\theta_O = \tan^{-1}\left(\frac{2h_{CG}}{T}\right)$$

Figure 6A:
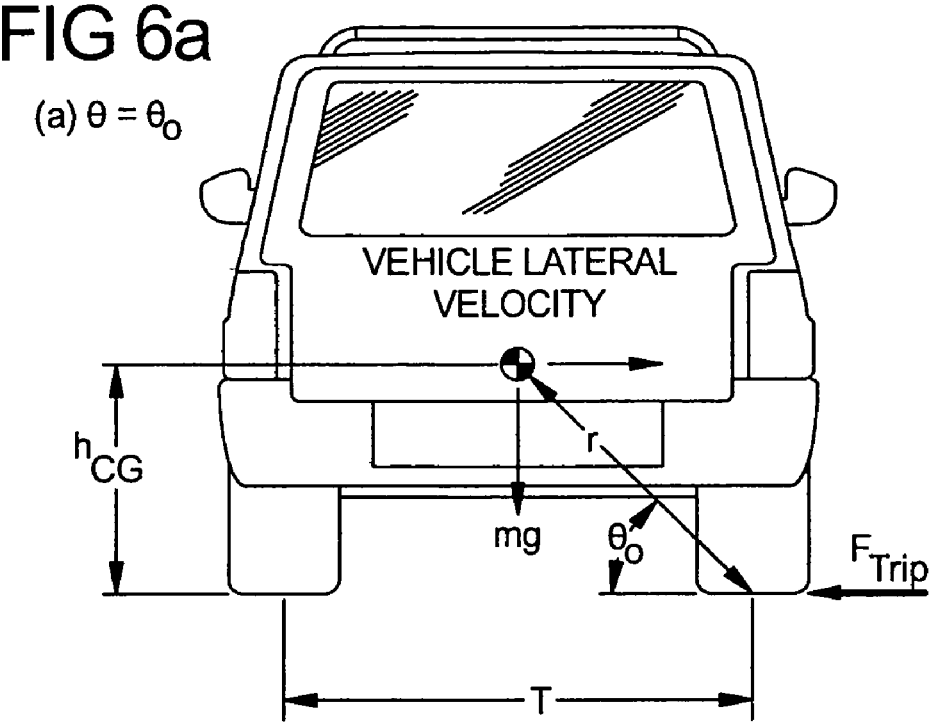
FIGS. 6a and 6b are force diagrams illustrating the relevant forces relating to a vehicle during a roll-over condition.
Figure 6B:
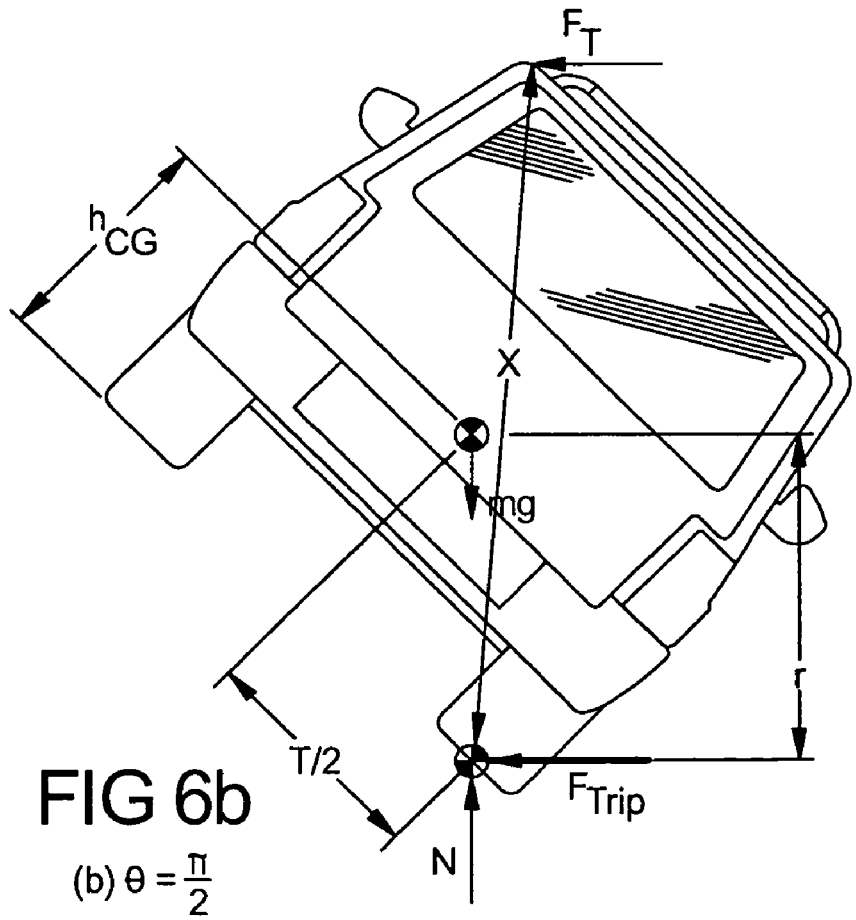

As illustrated in FIGS. 6a and 6b, the value T is the track width, m is the vehicle mass, $I_{CG}$ is the vehicle's moment of inertia about the longitudinal axis of the vehicle passing through the gravity center, g is gravity, $h_{CG}$ is the height of the center of gravity of the vehicle, $F_{TRIP}$ is the trip force applied to the vehicle that would lead to a potential roll condition, and N is the upward force applied to the vehicle from the ground.

For example, an activation threshold of 1.95 radians per second (i.e., 90% of an example vehicle's critical roll rate value) is chosen as a threshold for the vehicle. If the roll rate of the vehicle as a function of the roll angle exceeds the threshold and, depending on the roll rate, is greater or less than zero, a corresponding set of anti-roll thrusters 14 will be activated to generate thrust forces to resist the roll. FIG. 3 depicts a side view of the vehicle when the anti-roll thrusters 14 of the driver side are activated. Furthermore, FIG. 1 depicts a front view of the vehicle with the driver side thrusters activated to counteract any roll forces acting upon the vehicle.

Figure 8:
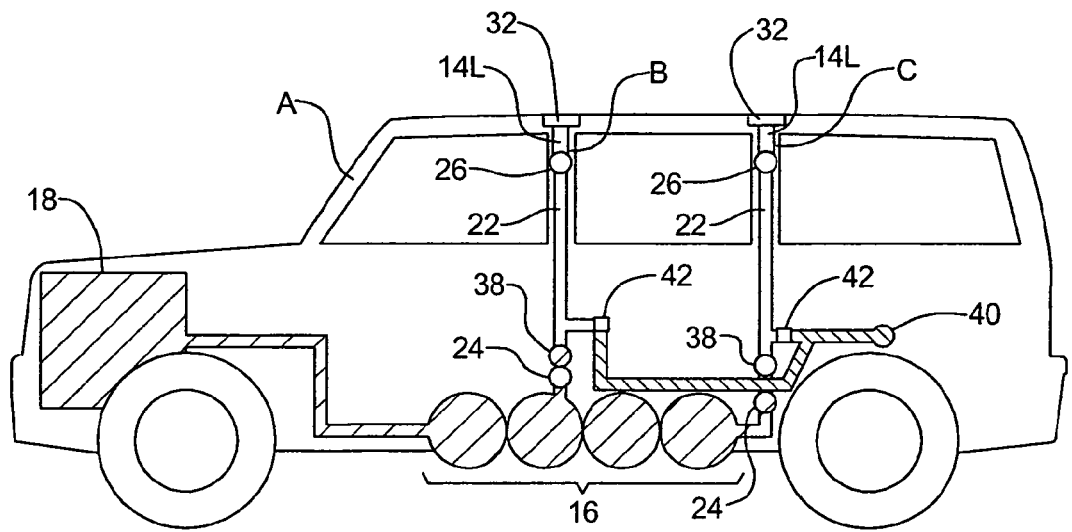
FIG. 8 is a schematic side view of a second embodiment of the anti-roll thruster system illustrated in a condition where roll-over risk is low.

FIGS. 8-11 depict another example embodiment of the invention, in which additional fast action valves 38 are added to isolate the piping sections 22 between the nozzle 14 and the fuel tank, and a nitrogen gas purging system including a nitrogen gas tank 40 and purging valves 42 have been added to purge the residue hydrogen in the piping sections 22. FIG. 8 shows the state of the anti-roll thruster system when the roll risk is low. The piping sections 22 are illustrated as clear to indicate that there is no hydrogen in the piping sections 22. Again, only the driver side anti-roll thruster system is illustrated here. The passenger side anti-roll thruster system is identical to the driver side. FIG. 9 shows the state of the anti-roll thruster system when the roll risk is high. In this condition, the fast action valves 38 have been opened to allow pressurized hydrogen to enter the piping sections 22 which are shaded for purposes of illustrating the hydrogen within the piping sections. Furthermore, the nozzle doors 32 are opened to prepare the anti-roll thruster system and the vehicle for a possible roll event. The nozzle doors 32 can be operated by a servo-motor or by other mechanical and electro-mechanical devices.

FIG. 10 shows the state of the anti-roll thruster system when the roll risk is very high (i.e., imminent). In this state, both fast-action valves 38 and 26 are activated and hydrogen jets 48 are shooting from the nozzles of the thrusters 14 to generate an anti-roll thrust force. In FIG. 10, the pipe sections 22, thrusters 14, and jets are all shaded in order to illustrate the hydrogen gas.

FIG. 11 depicts the activation of the nitrogen purging system when the roll risk has subsided. During a nitrogen purging process, the purging valves 42 are opened to allow nitrogen from tank 40 to purge remaining hydrogen from the piping sections 22 and thrusters 14. After purging the piping system with nitrogen gas, the anti-roll thruster system will be back to the normal state as shown in FIG. 8, and the system will be ready to be used again.

Figure 13:
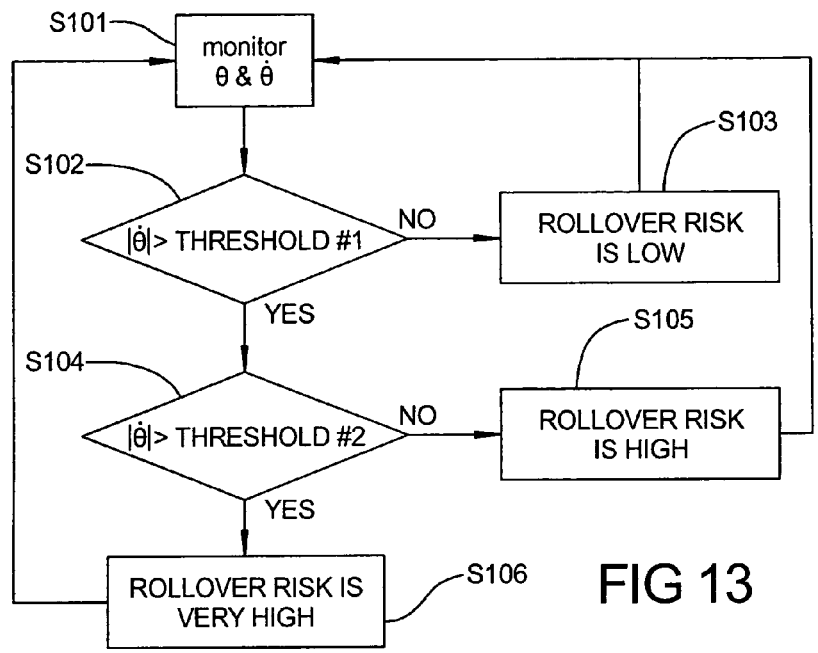
FIG. 13 is a flow diagram of a roll-over risk estimation algorithm.

FIG. 13 illustrates a risk evaluation algorithm utilized by the controller 30. In the risk assessment algorithm, the control monitors the instantaneous vehicle roll angle ($\theta$) and roll rate ($\dot{\theta}$) and compares the absolute value of the instantaneous vehicle roll rate ($|\dot{\theta}|$) with a first threshold value at Step S102. If the absolute value of the instantaneous roll rate is not greater than the threshold value, the roll-over risk is determined to be low at Step S103. If the absolute value of the instantaneous vehicle roll rate ($|\dot{\theta}|$) is greater than the first threshold value, then it is determined at Step S104 if the absolute value of the instantaneous vehicle roll rate ($|\dot{\theta}|$) is greater than a second threshold value. If it is determined that the absolute value of the instantaneous vehicle roll rate ($|\dot{\theta}|$) is not greater than the second threshold value, then it is determined at Step S105 that the roll-over risk is high. However, if it is determined at Step S104 that the absolute value of the instantaneous vehicle roll rate ($|\dot{\theta}|$) is greater than a second threshold value, it is determined at Step S106 that the roll over risk is very high.

Figure 14:
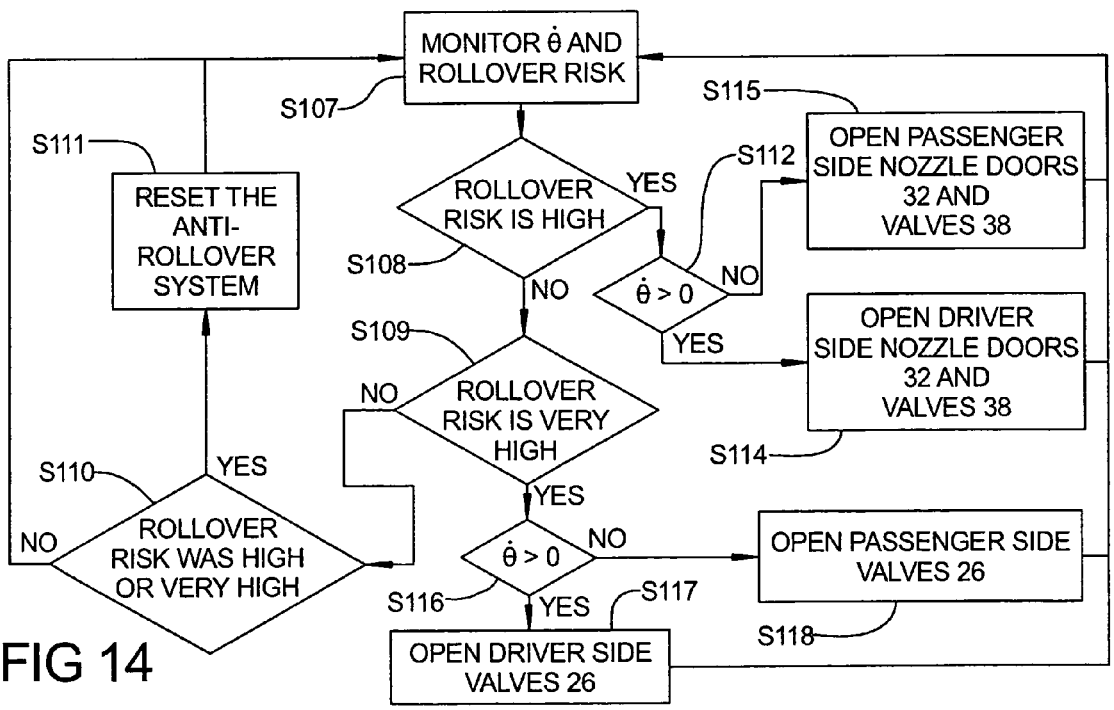
FIG. 14 is a flow diagram of an activation algorithm.

In FIG. 14, an activation algorithm is illustrated which monitors at Step S107 the vehicle roll rate and roll over risk. At Step S108, it is determined whether the roll over risk is high. If it is determined at Step S108 that the roll over risk is not high, it is determined at Step S109 whether the roll over risk is very high. If at Step S109 it is determined that the roll-over risk is not very high, the control proceeds to Step S110 where it is determined whether the roll-over risk was previously determined to be high or very high at Step S110. If not, the control returns to Step S107 and if so, the control goes to Step S11 wherein the anti-roll system is reset and the control then returns to Step S107. If after Step S108 it is determined that the roll over risk is high, it is determined at Step S112 whether $\theta>0$. If at Step S112 it is determined that $\theta>0$, then the driver side nozzle doors 32 and fast acting valves 38 are opened at Step S114. If at Step S112 it is determined that $\theta$ is not greater than zero, then the passenger side nozzle doors 32 and fast acting valves 38 are opened at Step S115. If it is determined that the roll-over risk is very high at Step S109, then at Step S116, it is determined whether the roll rate $\dot{\theta}$ is greater than zero, and if so, the driver side fast-acting valves 26 are opened at Step S117. If at Step S116 it is determined that the vehicle roll rate $\dot{\theta}$ is not greater than zero, the passenger side fast-acting valves 26 are opened at Step S118.

Figure 15:
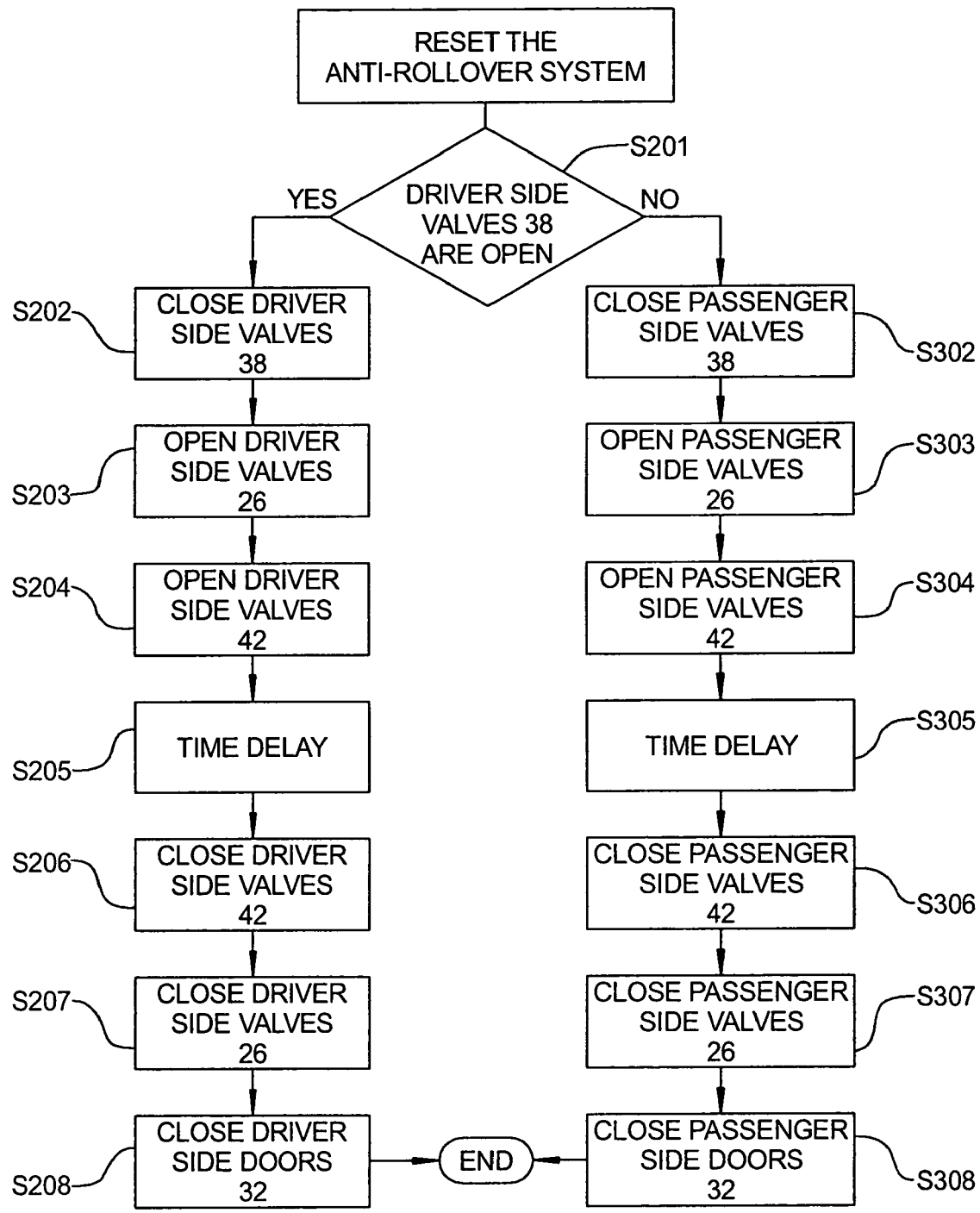
FIG. 15 is a flow diagram of a reset algorithm according to the principles of the present invention.
Figure 16:
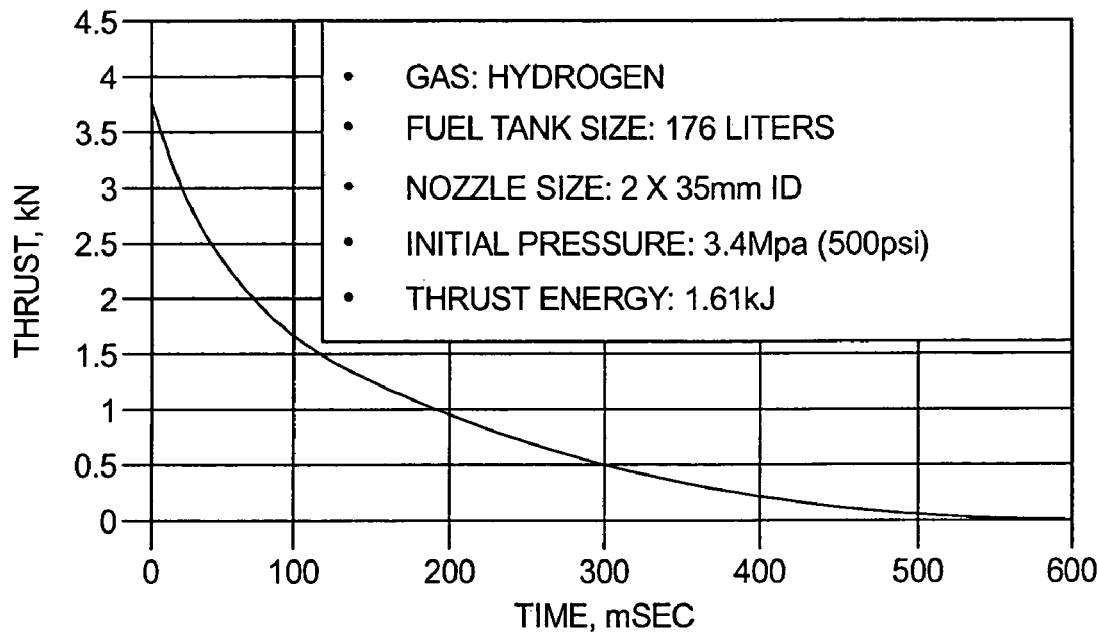
FIG. 16 is a graph of the thrust force time history of an example thruster system according to the principles of the present invention.

FIG. 15 is a flow diagram of an anti-roll system reset algorithm according to the principles of the present invention. As illustrated in FIG. 15 at Step S201, it is determined whether the valves 38 on the driver side are open. If so, valves 38 are closed at Step S202. Next, at Step S203, the fast-acting valves 26 are opened and at. Step S204, the nitrogen purge valves are opened. The nitrogen purge valves 42 are maintained opened for a predetermined time delay. At Step S205, and subsequently, the nitrogen purge valves 42 are then closed at Step S206 and the fast-acting valves 26 are closed at Step S207. At Step S208, the driver side thruster doors 32 are then closed and the algorithm ends. The above sequence of Steps S202-S208 provides a sequence of steps for resetting the anti-roll system for the thrusters on the driver side of the vehicle. A similar group of Steps S302-S308 is carried out for resetting the anti-roll system on the passenger side of the vehicle. Since the steps are identical but simply applied to the passenger side valves, a detailed description will be omitted.

The present invention utilizes an energy compensation method to minimize the size of the thruster nozzles 14. Specifically, the nozzles 14 are so designed that they will do anti-roll work equivalent to the difference between the one-quarter turn roll-over kinetic energy of a given hydrogen-powered vehicle and a target value. An acquired mass flow rate and nozzle throat area are then calculated based on the additional work. Using this method, the size of the nozzles can be minimized for ease of packaging. For example, the graph of FIG. 15 estimates that two nozzles, each with a 35 mm diameter throat, together with a 176 liter fuel tank under a pressure as low as 500 p.s.i. (5% of the assumed 10 thousand p.s.i. fuel tank pressure), would be sufficient to achieve improved roll stability. In this case, the work done by the anti-roll system is approximately 1.6 kJ.

Figure 17:
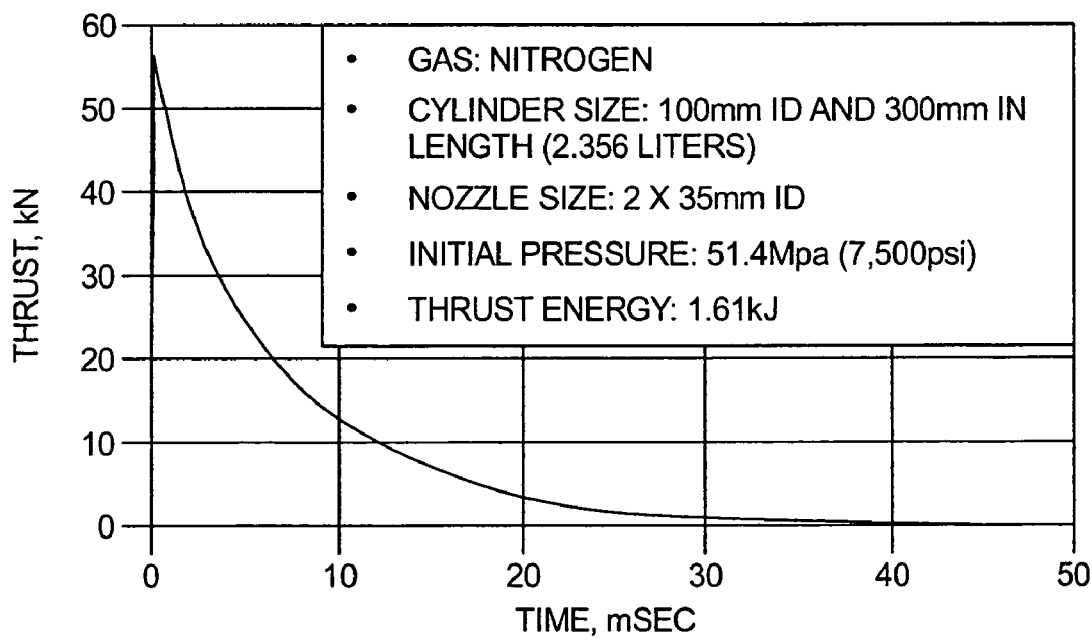
FIG. 17 is a thrust force time history of a stored nitrogen thruster system according to the principles of the present invention.

The proposed anti-roll thruster system could also be used for non-hydrogen powered vehicles if a large volume and/or high pressure gas source is added to the vehicle such as the nitrogen tank 40 as illustrated in FIGS. 8-11. FIG. 17 graphically illustrates that two nozzles, each with a 35 mm diameter throat, together with a 2.356 liter nitrogen tank under pressure of 7500 p.s.i. would be sufficient for an exemplary non-hydrogen powered vehicle to provide a required thrust energy of 1.61 kJ to counteract significant roll forces.

It will be appreciated that the thruster system could also be used for anti-pitch. The anti-roll thruster system could also be used for dumping the hydrogen fuel when a severe crash event is detected by other onboard crash sensors, such as an airbag sensor, to lower the risk of post-crash damage. For example, an airbag deployment signal could be used to open the fast action valves to timely dump the high pressure hydrogen gas in the fuel tank to atmosphere to avoid post-crash hazards.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A roll stabilization system for a vehicle, comprising:
    at least one thruster mounted in a side pillar of the vehicle and in selective communication with a source of pressurized gas;
    a fuel cell system located on-board the vehicle that provides power to the vehicle; and
    a controller system for detecting a potential roll condition of the vehicle and releasing pressurized gas from said source of pressurized gas to said thruster in response to a detected potential roll condition,
    wherein said pressurized gas is an inert gas for use with said fuel cell system.

2. The roll stabilization system according to claim 1, wherein said at least one thruster includes a first thruster mounted on a first side of the vehicle and a second thruster mounted on a second side of the vehicle.

3. The roll stabilization system according to claim 1, wherein said source of pressurized gas is stored hydrogen.

4. The roll stabilization system according to claim 1, wherein said source of pressurized gas is stored nitrogen.

5. The roll stabilization system according to claim 1, further comprising a pressurized gas delivery system including a pressure regulator valve for allowing a regulated pressure level to accumulate in said pressurized gas delivery system up stream of a thruster nozzle.

6. The roll stabilization system according to claim 5, wherein said pressurized gas delivery system includes a secondary valve disposed downstream of said pressure regulator valve and upstream of said thruster nozzle.

7. The roll stabilization system according to claim 6, wherein said controller system controls said pressure regulator valve for allowing an increased regulated pressure level to accumulate in said pressurized gas delivery system up stream of said secondary valve in response to a detected potential roll condition.

8. The roll stabilization system according to claim 6, wherein said pressurized gas delivery system includes a tertiary valve disposed between said regulator valve and said secondary valve and further comprising a gas purging system for purging a portion of said pressurized gas delivery system between said secondary and tertiary valves.

9. A method of resisting rollover for an automobile, comprising:
   mounting a first thruster on a first side of said automobile;
   mounting a second thruster on a second side of said automobile, said first and second thrusters being in selective communication with a source of pressurized gas;
   sensing conditions for detecting a potential roll condition of said automobile;
   releasing pressurized gas from said source of pressurized gas to one of said first and second thrusters in response to a detected potential roll condition for generating a counteracting force for resisting the detected roll condition; and
   generating said counteracting force for resisting the detected roll condition by releasing said pressurized gas from one of said first and second thrusters in an upward, generally vertical direction,
   wherein said pressurized gas is pressurized hydrogen gas used for an on-board fuel cell system.

10. The method according to claim 9, further comprising purging pressurized gas from a gas delivery system upstream of at least one of said first and second thrusters.

11. The method according to claim 9, further comprising regulating a pressure of pressurized gas in a gas delivery system upstream of said first and second thrusters in response to a detected increased risk of a roll condition.

12. A roll stabilization system for a vehicle, comprising:
   at least one thruster mounted on the vehicle and in selective communication with a source of pressurized gas;
   a controller system for detecting a potential roll condition of the vehicle and releasing pressurized gas from said source of pressurized gas to said thruster in response to a detected potential roll condition; and
   a fuel cell system located onboard the vehicle for providing power to the vehicle,
   wherein said source of pressurized gas is stored hydrogen for use with said fuel cell system.

13. A roll stabilization system for a vehicle, comprising:
   at least one thruster mounted on the vehicle and in selective communication with a source of pressurized gas;
   a controller system for detecting a potential roll condition of the vehicle and releasing pressurized gas from said source of pressurized gas to said thruster in response to a detected potential roll condition; and
   a pressurized gas delivery system including a pressure regulator valve for allowing a regulated pressure level to accumulate in said pressurized gas delivery system up stream of a thruster nozzle, wherein said pressurized gas delivery system includes a secondary valve disposed downstream of said pressure regulator valve and upstream of said thruster nozzle, and said pressurized gas delivery system includes a tertiary valve disposed between said regulator valve and said secondary valve and further comprising a gas purging system for purging a portion of said pressurized gas delivery system between said secondary and tertiary valves;
   wherein said pressurized gas is an inert gas.

14. The roll stabilization system according to claim 13, wherein said controller system controls said pressure regulator valve for allowing an increased regulated pressure level to accumulate in said pressurized gas delivery system up stream of said secondary valve in response to a detected potential roll condition.

15. A method of resisting rollover for a motor vehicle, comprising:
   mounting a first thruster on a first side of said motor vehicle;
   mounting a second thruster on a second side of said motor vehicle, said first and second thrusters being in selective communication with a source of pressurized gas;
   sensing vehicle conditions for detecting a potential roll condition of said vehicle;
   releasing pressurized gas from said source of pressurized gas to one of said first and second thrusters in response to a detected potential roll condition for generating a counteracting force for resisting the detected roll condition; and
   purging pressurized gas from a gas delivery system upstream of at least one of said first and second thrusters, wherein said pressurized gas is pressurized hydrogen gas used for an on-board fuel cell system.

* * * * *